United States Patent
Calderon et al.

(10) Patent No.: US 7,876,526 B2
(45) Date of Patent: Jan. 25, 2011

(54) FILL-PORT ASSEMBLY WITH REFLOWED SEAL MEMBER

(75) Inventors: Cruz Calderon, Foxboro, MA (US); Guo Jin Yue, Northboro, MA (US); Michael J. Rogers, Wrentham, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 928 days.

(21) Appl. No.: 11/747,669

(22) Filed: May 11, 2007

(65) Prior Publication Data

US 2007/0263319 A1   Nov. 15, 2007

Related U.S. Application Data

(60) Provisional application No. 60/747,053, filed on May 11, 2006.

(51) Int. Cl.
*G11B 33/14* (2006.01)
(52) U.S. Cl. .................................... 360/97.02
(58) Field of Classification Search ... 360/97.02–97.03; 137/234.5, 233, 231, 254.5, 454.5; 141/65–66, 141/98, 326
See application file for complete search history.

(56) References Cited

U.S. PATENT DOCUMENTS

| 1,549,213 | A | * | 8/1925 | Payne ......................... 137/234 |
| 4,924,796 | A | * | 5/1990 | Duffy ......................... 114/219 |
| 5,944,068 | A | * | 8/1999 | Hool ........................... 141/65 |
| 6,144,178 | A |   | 11/2000 | Hirano et al. |
| 6,522,980 | B1 |   | 2/2003 | Arnold |
| 6,644,362 | B2 |   | 11/2003 | Bernett |
| 6,646,821 | B2 |   | 11/2003 | Bernett et al. |
| 6,785,089 | B2 | * | 8/2004 | Bernett et al. ............ 360/97.02 |
| 6,819,517 | B2 |   | 11/2004 | Fioravanti et al. |
| 6,831,811 | B1 |   | 12/2004 | Andrikowich et al. |
| 6,999,262 | B2 |   | 2/2006 | Han et al. |
| 7,046,469 | B2 | * | 5/2006 | Tanaka ........................ 360/69 |
| 7,570,454 | B1 | * | 8/2009 | Andrikowich et al. .... 360/97.02 |

* cited by examiner

*Primary Examiner*—A. J. Heinz
(74) *Attorney, Agent, or Firm*—Fellers, Snider et al.

(57) ABSTRACT

A fill-port sealing assembly for sealing a housing, such as a hermetically sealed housing of a data storage device. A fill port body extends through an opening in a substrate and has a central bore communicating between a first side and a second side of the substrate. A compression member threadingly engages the central bore to compress an annular seal member and seal against passage of a low density gas through the central bore.

20 Claims, 4 Drawing Sheets

FILL-PORT ASSEMBLY WITH REFLOWED SEAL MEMBER

RELATED APPLICATIONS

The present application makes a claim of domestic priority to U.S. Provisional Application Ser. No. 60/747,053 filed on May 11, 2006, entitled "Hermetic Fill-Port Quick Seal."

BACKGROUND

It has been found desirable in some applications to provide a hermetically sealed housing. For example, data storage devices can be advantageously hermetically encapsulated to isolate an interior environment from contamination or other effects from the surrounding atmosphere.

The use of an internally enclosed low density gas within a data storage device housing can also generally provide improved windage and hydrodynamic flight characteristics for read/write transducers adjacent a rotatable storage medium, as compared to a standard air atmosphere.

SUMMARY

Embodiments of the present invention are generally directed to an apparatus comprising a fill port body extending through an opening in a substrate and comprising a central bore communicating between a first side and a second side of the substrate. A compression member threadingly engages the central bore to compress an annular seal member and seal against passage of a low density gas through the central bore.

DETAILED DESCRIPTION

Figure 1:
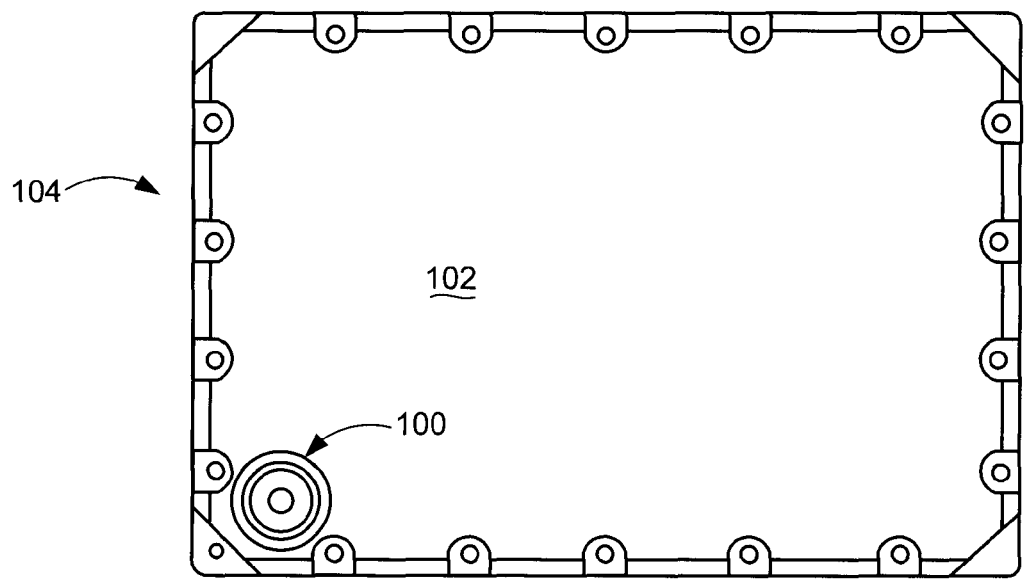
FIG. 1 is a top view of a data storage device housing having a fill-port assembly in accordance with various embodiments of the present invention.

FIG. 1 illustrates a fill-port sealing assembly 100 in accordance with various embodiments of the present invention. The fill-port assembly 100 is provided in conjunction with a hermetically sealed housing 102 of a data storage device 104, although such is merely for purposes of illustration and is not limiting.

The fill-port assembly 100 is used to facilitate the filling of the housing 102 with a low density gas, such as an inert gas (e.g., helium) atmosphere. While shown disposed in a corner of the housing 102, the fill-port assembly 100 can be disposed at any convenient location of the data storage device 102.

Figure 2:
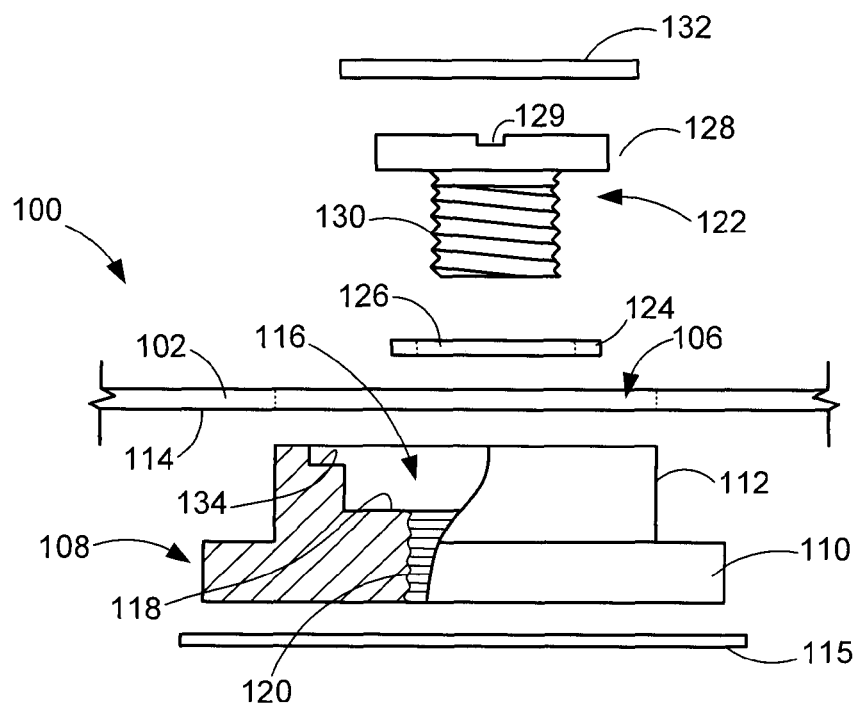
FIG. 2 is an exploded view of one embodiment of the fill-port assembly.

As shown in FIG. 2, the fill-port assembly 100 cooperates with an opening 106 through the housing (substrate) 102. A fill port body 108 (also referred to as a "seal body") of the fill-port assembly 100 has a lower body portion 110 and an upper body portion 112. The lower body portion 110 engages an inner surface 114 of the substrate 102, and the upper body portion 112 extends through the opening 106 in the substrate 102.

A joint seal 115 surrounds a periphery of the seal body 108 to contactingly engage the inner surface 114 of the substrate 102. The joint seal 115 is preferably a brazed or welded union to connect the seal body 108 to the inner surface 114 and seal the opening 106.

Figure 3:
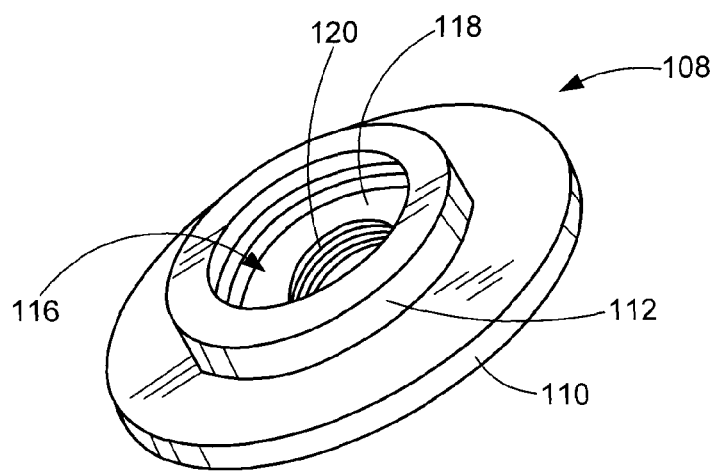
FIG. 3 is a perspective view of one embodiment of a seat seal of the fill-port assembly.
Figure 4:
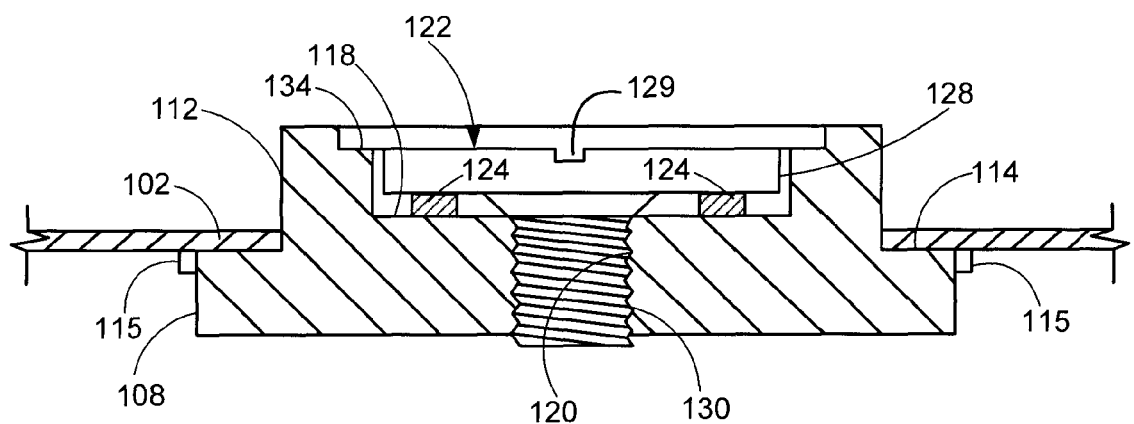
FIG. 4 is a cross-sectional view of one embodiment of the fill-port assembly of with a temporary seal in place.

As further shown in FIGS. 3 and 4, the seal body 108 has a central bore 116 extending therethrough to provide fluid communication between the interior of the housing 102 and the external environment. Within the central bore 116 is a sealing shoulder, or seat, 118. A portion 120 of a sidewall of the central bore 116 is threaded for engagement by a threaded compression member 122. The compression member is preferably characterized as a bolt.

An annular seal member 124 has a central opening 126 (FIG. 2) complimentary to the compression bolt 122 for disposition on the sealing shoulder 118. In some embodiments, the sealing shoulder 118 will be sized to receive the seal member 124 as snugly as possible, thus leaving minimum locations at which low density gas can escape through the central bore 116.

The compression bolt 122 has a head 128 with a slot 129 and a threaded shank 130, the latter of which engages the threaded portion 120 of the central bore 116. The sealing shoulder 118 is preferably sized to receive the head 122 of the compression bolt 122. When tightened by an appropriate driver engaged in the slot 129, the shank 130 extends through the central opening 126 of the seal member 124 and engages the threaded portion 120 of the central bore 116. The head 122 compresses the seal member 124 against the sealing shoulder 118 to create a barrier against the passage of low density gas, such as from a pressurized interior of the device 104 when the substrate 102 is the housing thereof.

In one embodiment, the compression bolt 122 is a size 4-40 screw made of a material that will withstand rotary torque of up to 8 in-lb, and the seal member 124 is a metal washer that is deformed when the seal member 124 is tightened.

The seal member 124 in FIG. 2 is made of the same or similar metal or metals with similar thermal coefficient of expansion as the seal body 108, as this minimizes differences in thermal expansion and contraction therebetween. In one embodiment, the seal member 124 and the seal body 108 are made of steel such as CRES AM 350 or CRES 300/400 and fully annealed copper/aluminum, respectfully.

FIG. 4 shows the seal member 124 in position beneath the compression bolt 122 on the sealing shoulder 118 of the seal body 108. It is contemplated that the seal member 124 will provide a temporary hermetic seal as the seal member 124 deforms and conforms to the contacting surfaces of the head 128 and the sealing shoulder 118. Substantially no low density gas will escape through the seal 124 over short periods of time while the temporary hermetic seal is in place (e.g., about 30 days or so).

It is contemplated, however, that the seal member 124 may not provide adequate sealing against the loss of a low density gas over the operational lifetime of the device 104, which is usually measured in years, due to a number of effects such as temperature cycling.

Nevertheless, the temporary nature of the sealing provided by the seal member 124 is sufficient to maintain a hermetically sealed condition for the device 104 during manufacturing and testing. Reworking of the device 104 is readily facilitated as the temporary seal can be released simply by disengaging the compression bolt 122 from the central bore 116. The housing 102 can be subsequently refilled by introducing new low density gas into the housing through the central bore 116, and resealed through reinsertion of the compression bolt 122 back into the central bore 116 to compress the same, or a new, seal member 124. The same fill-port assembly 100 can thus be used to effect a temporary seal for the device 104 multiple times, allowing for testing and reworking without the need to create additional apertures or ports through the housing 102, or to destructively alter the assembly 100.

Figure 5:
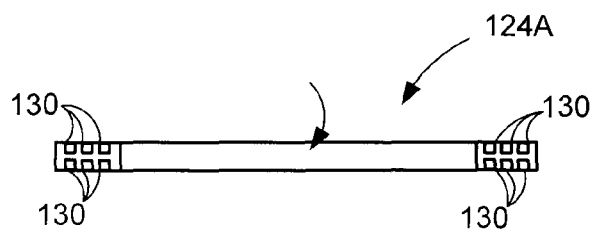
FIG. 5 is a cross-section of an alternative embodiment of a seal washer used in embodiments of the present invention.

The sealing effectiveness of this temporary seal arrangement can be enhanced through the use of an alternative seal member 124A, FIG. 5. The seal member 124A is provided with one or more annular projections (ridges) 130 concentrically arranged with respect to each other. The annular ridges 130 provide repetitive points of contact with the sealing shoulder 118 and the bolt head 128, thereby further reducing the escapement of low density gas past the seal member 124. The annular ridges 130 will also provide enhanced sustained contact with the sealing shoulder 118 and head 128 during thermal cycling.

Figure 6A:
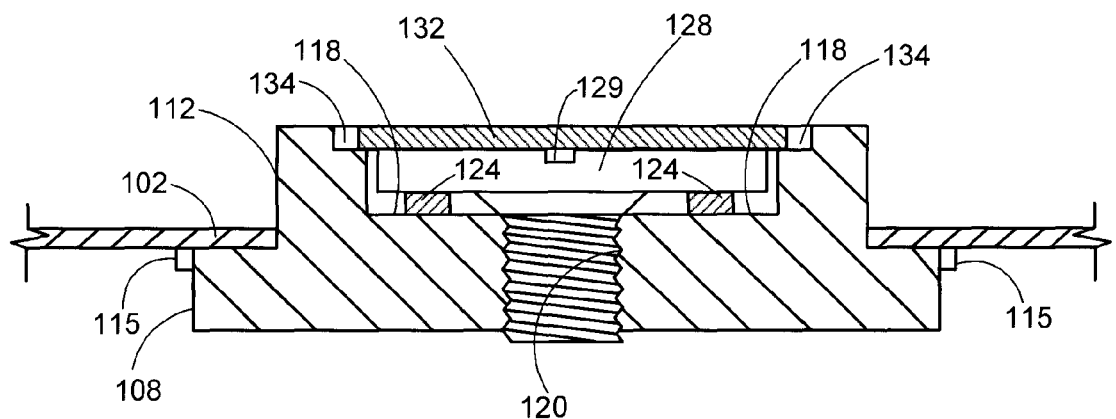
FIG. 6A shows a second seal member in the form of a solder disk placed into a central bore of the fill-port assembly.
Figure 6B:
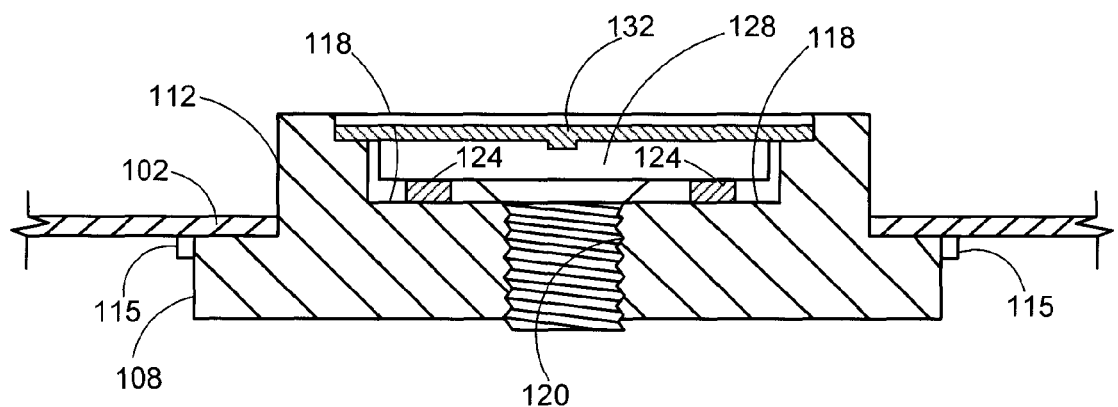
FIG. 6B depicts the second seal member after having been melted to flow within the central bore and establish a permanent seal for the fill-port assembly.

To further enhance the sealing of the fill-port assembly 100, a second sealing member is provided in some embodiments such as denoted at 132 in FIGS. 6A-6B. The second sealing member 132 is exemplified as a pre-formed disk of flowable material, such as solder, which provides a permanent, hermetic seal.

The second member 132 is dimensioned and shaped to conform to the size of a receiving shoulder 134 formed by the seal body 108 within the central bore 116. With the compression bolt 122 threadingly engaged and tightened in the central bore 116, as shown in FIG. 6A, the solder disk 132 is placed over the bolt head 128. Heat is thereafter applied to melt and flow the second member 132, such as shown in FIG. 6B, to create the permanent hermetic seal.

As the second member 132 is melted, the material (e.g., solder) will flow to fill any gaps existing between the receiving shoulder 134 and the compression bolt 122 to permanently seal the central bore 1116 and retain low density gas within the interior of the housing 102 for an acceptable time period.

As will be appreciated by a skilled artisan, in order for the second member 132 to hermetically seal the bore 116, the material should adhere to the components of the fill-port assembly 100. Thus, in this embodiment the compression bolt 122 is made of bronze, brass or copper-plated stainless steel. Alternatively, the compression bolt 122 can be plated, such as with nickel, to enhance solder adherence. The member 132 will preferably be a dense material used for hermetic sealing, such as a low-temperature solder with flux. The resulting metal-to-metal sealing provides a suitable low permeable path for certain types of inert gas, such as helium, although non-metal materials can alternatively be used.

As will be appreciated, there are a variety of ways to heat and melt second seal member 132 to create the permanent hermetic seal. By way of example, embodiments of the present invention may utilize a non-contact form of soldering, such as radio-wave induction soldering, to heat and melt the member 132, thereby creating the hermetic seal in a matter of seconds. Additional means of heating and melting the seal material will be known to those skilled in the art. When the permanent seal is completed, the seal will be substantially leak proof to the passage of the retained gas.

Figure 7:
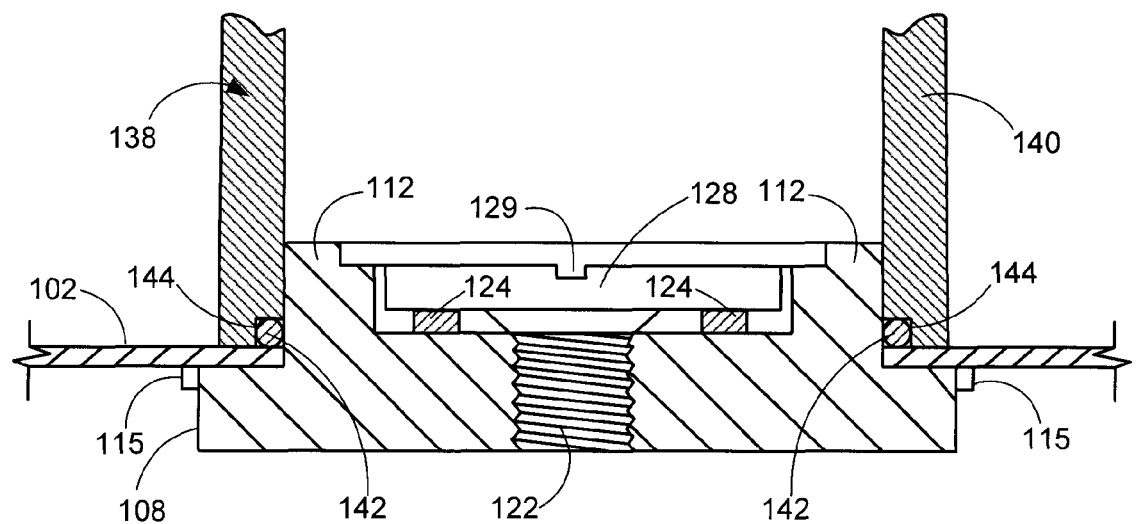
FIG. 7 illustrates a portion of a valve housing used in conjunction with the fill-valve assembly.

FIG. 7 illustrates a valve assembly 138 that can be used in conjunction with the fill-port assembly 100 to evacuate fluid (e.g., air) from the interior of a housing, and to subsequently fill the interior of the housing with a low density gas.

The valve assembly 138 has a valve body 140 which is sealable against the substrate 102. An o-ring seal 142 is disposed in a notch 144 of the valve body 140 such that the o-ring seal 142 contacts the outer surface of the upper body portion 112 of seal body 108 to create a gas-tight seal over the seal body 108. In order to maintain the seal, the body 140 is pressed against the housing 102 with sufficient force to create a seal.

The valve body 140 has two openings, the first of which includes the o-ring seal 142 and is aligned over the seal body 108. The second opening (not shown) is in fluid communication with a vacuum source to evacuate the air from the interior of the housing; the second opening is also in fluid communication with a source of low density gas, such as hydrogen or helium (not shown). The vacuum source evacuates air from the interior of the housing, and the low density gas source fills the housing with low density gas through the same opening without the need to remove the valve body 140 and lose the seal.

Although not shown in the drawings, once the housing is filled with an appropriate quantity of gas, the housing can be inverted while still attached to the valve body 140. This will prevent escape of the low density gas when the valve body is removed. Upon such removal, the fill-port assembly 100 is sealed using one or more of the techniques described above.

Figure 8:
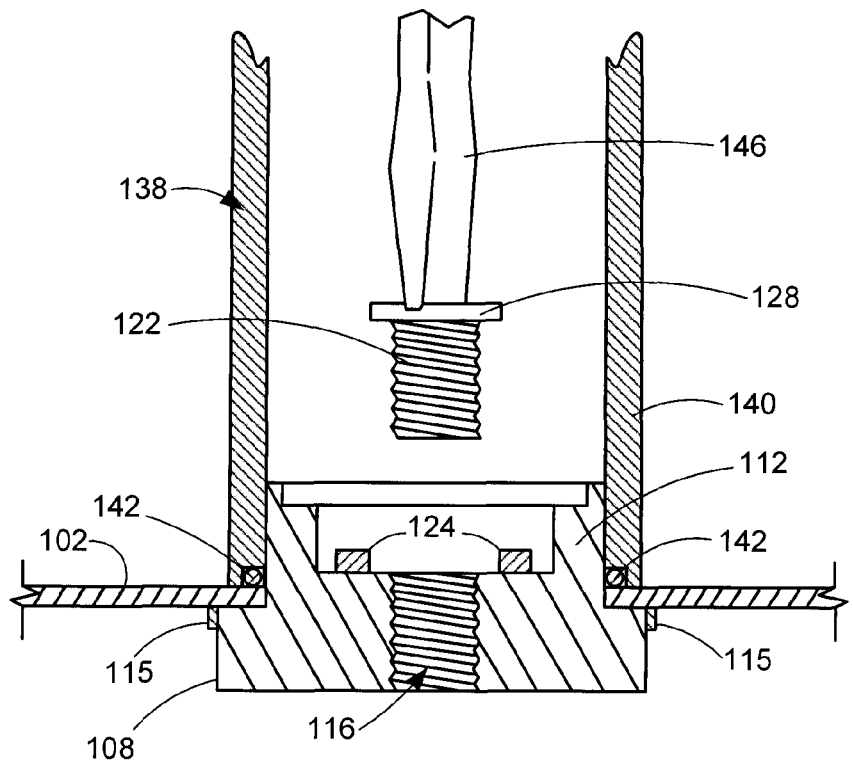
FIG. 8 shows a driver tool used to selectively advance and remove the compression member with respect to the central bore.

FIG. 8 depicts an alternative embodiment for the valve assembly 138 in which air can be evacuated from the housing, low density gas refilled, and the fill-port assembly 100 sealed, all while the valve assembly 138 remains attached to the housing. In this embodiment, a reciprocating driver member 146 is disposed to extend within the valve body 140 to engage the slot 129 and may be magnetic to hold the compression bolt 122 in place as the reciprocating member 146 is moved toward the central bore 116 of the seal body 108.

The reciprocating member 146 can be rotated to tighten the compression bolt 122 in the bore 116 once in place through the seal member 124. Preferably, the reciprocating member 146 can be retracted from the bore 116 sufficiently to allow fluid communication between the interior of the housing via the bore 116, while maintaining support of the compression bolt 122. In this manner, the vacuum source can evacuate air from the disc drive and the low density gas source can fill the disc drive housing 138. Once filled, the reciprocating member 146 can place the compression bolt 122 through the seal member 124 into the bore 116 and tighten the compression bolt 122 to create a temporary seal. The valve body 140 is then disengaged. The permanent seal via the second seal member 132 can then be applied to the fill-port assembly 100 as described above.

While the fill-port assembly 100 has been described in the environment of a data storage device housing, it will be appreciated that such is merely for purposes of illustration and is not limiting. Rather, the fill-port assembly 100 as embodied herein can be utilized in any number of different environments and can use any number of materials, constructions and physical configurations as desired.

Accordingly, it is to be understood that even though numerous characteristics and advantages of various embodiments of the invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. An apparatus comprising:
a fill port body extending through an opening in a substrate and comprising a central bore communicating between a first side and a second side of the substrate;
a first seal member;
a compression member which threadingly engages the central bore to compress the first seal member and seal against passage of a low density gas through the central bore; and
a second seal member formed of a material adapted to, when melted, flow within the central bore to permanently seal against the passage of said low density gas therethrough.

2. The apparatus of claim 1, wherein the compression member is characterized as a bolt with a threaded portion which engages a threaded portion of the central bore and a head portion which compresses the first seal member against a shoulder surface of the central bore.

3. The apparatus of claim 2, wherein the head portion is adapted for engagement by a driver tool to threadingly advance the compression member into the central bore.

4. The apparatus of claim 1, wherein the first seal member is characterized as a metal washer.

5. The apparatus of claim 1, further comprising a joint seal disposed to seal a junction between the fill port body and the substrate.

6. The apparatus of claim 1, in which the first seal member is characterized as an annular seal member.

7. The apparatus of claim 1, in which the second seal member is characterized as a solder pre-form adapted to reflow within the central bore.

8. The apparatus of claim 1, wherein the fill port body is inserted through the opening of the substrate in a first axial direction, and wherein the compression member is inserted into the central bore in a second axial direction opposite the first axial direction.

9. The apparatus of claim 1, wherein the substrate forms a portion of a hermetically sealed housing and the fill port body is configured to facilitate filling of the housing with the low density gas.

10. The apparatus of claim 9, wherein the housing is characterized as a housing of a data storage device in which a storage medium is disposed.

11. An apparatus comprising:
a fill port body comprising a first body portion configured to extend through a substrate opening, a second body portion configured to extend adjacent a first side of the substrate, and a central bore extending through the first and second body portions;
a first seal member;
a compression member configured to threadingly engage the central bore to compress the first seal member and seal against passage of a low density gas through the central bore; and
a second seal member comprising a reflowed material which permanently seals the central bore.

12. The apparatus of claim 11, wherein the compression member is characterized as a bolt with a threaded portion which engages a threaded portion of the central bore and a head portion which compresses the first seal member against a shoulder surface of the central bore.

13. The apparatus of claim 12, wherein the head portion is engaged by a driver tool to threadingly advance the compression member into the central bore.

14. The apparatus of claim 11, wherein the first seal member is characterized as a metal washer.

15. The apparatus of claim 11, in which the second sealing member comprises solder which is melted to form a solder joint that adheres to the compression member and a recessed surface of the central bore.

16. The apparatus of claim 11, wherein the compression member is plated with a layer of metal to enhance adherence of the reflowed second sealing member thereto.

17. The apparatus of claim 11, in combination with a hermetically sealed housing so that the fill port body is configured to facilitate filling of the housing with the low density gas.

18. The apparatus of claim 11, in which the second sealing member is placed onto a head portion of the compression member and melted to form a hardened connection joint that seals the central bore against said passage of the low density gas.

19. An apparatus comprising:
a compression member which threadingly engages a central bore of a fill port and compresses a first seal member to seal the central bore against a flow of a low density gas therethrough; and
a second seal member comprising a reflowable material which is melted to form a connection joint in contacting engagement with the compression member to permanently seal the central bore against said flow.

20. The apparatus of claim 19, in which the second seal member comprises solder which is reflowed within the central bore to establish the connection joint.

* * * * *